United States Patent
Toskala et al.

(10) Patent No.: US 6,377,606 B1
(45) Date of Patent: Apr. 23, 2002

(54) METHOD FOR REDUCING INTERFERENCE, AND A RADIO SYSTEM

(75) Inventors: Antti Toskala, Helsinki; Ari Hottinen, Vantaa, both of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/155,205

(22) PCT Filed: Mar. 24, 1997

(86) PCT No.: PCT/FI97/00186

§ 371 Date: Sep. 24, 1998

§ 102(e) Date: Sep. 24, 1998

(87) PCT Pub. No.: WO97/36378

PCT Pub. Date: Oct. 2, 1997

(30) Foreign Application Priority Data

Mar. 25, 1996 (FI) .................................................. 961362

(51) Int. Cl.⁷ .............................................. H04L 27/30
(52) U.S. Cl. ........................ 375/130; 375/137; 375/140
(58) Field of Search .................................. 375/130, 148, 375/134, 135, 136, 137; 370/320, 335, 342, 441, 479; 455/39, 67.6, 73, 142, 500

(56) References Cited

U.S. PATENT DOCUMENTS

| 4,774,715 A | | 9/1988 | Messenger |
| 4,875,221 A | | 10/1989 | Mori |
| 5,561,395 A | * | 10/1996 | Melton et al. ................... 330/2 |
| 5,748,687 A | * | 5/1998 | Ozluturk ....................... 375/367 |
| 5,832,029 A | * | 11/1998 | Mimura ........................ 375/208 |
| 5,844,496 A | * | 12/1998 | Seki et al. .............. 340/825.31 |
| 5,872,810 A | * | 2/1999 | Philips et al. ................. 375/222 |
| 5,887,020 A | * | 3/1999 | Smith et al. ................. 375/200 |
| 5,940,428 A | * | 8/1999 | Ishiguro et al. ............. 375/200 |
| 5,991,332 A | * | 11/1999 | Lomp et al. ................. 375/206 |
| 6,028,868 A | * | 2/2000 | Yeung et al. ................ 370/515 |

FOREIGN PATENT DOCUMENTS

| CA | 1321655 | 1/1993 |
| WO | 96/05669 | 2/1996 |
| WO | 96/38929 | 12/1996 |

OTHER PUBLICATIONS

Patent Abstract of Japan, vol. 18, No. 603, JP6–232837, H.Kasamatsu.

* cited by examiner

Primary Examiner—Chi Pham
Assistant Examiner—Bayard Emmanuel
(74) Attorney, Agent, or Firm—Pillsbury Winthrop LLP (57) ABSTRACT

A method for reducing interference and a radio system where a signal spreadcoded by digital pseudo noise is used for communication are provided. As the delay distribution of the signals of subscriber terminal equipment at base stations is great and thus the mutual interference of the signals may also be great, the base station adjusts the phase of the spreading codes of the subscriber terminal equipment so as to reduce interference. The method and the radio system enable high data rates and reduce the calculation required for interference correction.

19 Claims, 4 Drawing Sheets

METHOD FOR REDUCING INTERFERENCE, AND A RADIO SYSTEM

FIELD OF THE INVENTION

The present invention relates to a method for reducing interference used in a radio system including several base stations and subscriber terminal equipments which comprise a transmitter and a receiver, and which use a spread spectrum method for sending a signal, in which method a narrowband signal is spread by a spreading code into a broadband signal.

The present invention also relates to a radio system comprising several base stations and subscriber terminal equipments which comprise a transmitter and a receiver, and which are arranged to use a spread spectrum method for sending a signal, in which method a narrowband signal is spread by a spreading code into a broadband signal.

BACKGROUND OF THE INVENTION

In the spread signal system and particularly in the CDMA technique, a user's narrowband data signal is modulated by a spreading code with a broader band than a data signal to a relatively broad band which is usually over 1 MHz. Generally, a spreading code is formed of a long pseudo-random bit sequence. The bit rate of a spreading code is considerably higher than that of a data signal and in distinction from data bits and data symbols, bits of a spreading code are called chips. Each data symbol of a user is multiplied by all the chips of the spreading code. In that case a narrowband data signal will be spread to the frequency band used by the spreading code. Signals of each user has a specific spreading code. When several users send their signals simultaneously on the same frequency band, data signals are separated from one another in receivers on the basis of a pseudo-random spreading code.

The bit sequences of spreading codes used in the CDMA system are not, however, completely independent of one another, that is, orthogonal.

Non-orthogonality becomes stronger if the sequences have shifts with respect to one another, and this non-ideal state results in that the cross correlation between different codes varies at different delay values. Because of this, the mutual interference of signals from a different radio system vary in multipath propagation when signal routes and thus delays change, particularly when subscriber terminal equipments move. In that case in interference cancellation based on the correlation of spreading codes, a correlation matrix has to be continuously updated, which is laborious to calculate. Furthermore, when the delay with high data rates is of the length of the code sequence, that is, of the data symbol, it causes mutual interference between signals. Because of varying delays, the selection of the spreading codes to be used is difficult when low cross correlation values are to be attained.

Present radio systems do not use interference cancellation, which is followed by that the capacity of the systems will remain relatively low and the quality of connections will suffer. The number of useful spreading codes will also remain rather low as the cross correlations between the spreading codes has to be low on all delay values.

CHARACTERISTICS OF THE INVENTION

The object of the present invention is to realize a method with which the capacity of the radio system is enlarged, the number of useful spreading codes is increased and the quality of the connection is improved. The amount of calculation needed for interference cancellation can also be reduced.

This is attained with a method shown in the preamble that is characterized in that the receiver of the signal forms mutual interference information on the signals received by it and on the basis of the mutual interference information, the receiver sends to the transmitter of the signal a control command of the spreading code of the signal comprising information about the size of the phase control needed in the phase setting of the spreading code, the receiver of the signal similarly changes the phase setting of its spreading code used for reception, and the transmitter of the signal adjusts the phase of the spreading code used for transmitting the signal on the basis of the control command sent from the receiver of the signal to diminish mutual interference between different signals.

The method of the invention is also characterized in that the receiver of the signal sends to the transmitter of the signal a control command of the spreading code of the signal comprising information about phase hopping, the receiver of the signal similarly hops the phase of its spreading code used for reception, and the transmitter of the signal adjusts the phase of the spreading code used for transmission by hopping the phase of the spreading code continuously on the basis of a predetermined sequence to diminish mutual interference between the signals.

The radio system of the invention is characterized in that the receiver of the signal comprises an interference information means for forming mutual interference information on the signals received by it, the receiver comprises a command means arranged to form a control command of the phase of the spreading code on the basis of the mutual interference information formed by the interference information means and to send in the control command information about the size of the phase adjustment of the spreading code, or about the sequence of spreading code hopping, and the receiver of the signal is arranged to adjust the phase of the spreading code of its reception on the basis of the control command, and the transmitter of the signal comprises a control means for adjusting the phase of its spreading code on the basis of the control command sent from the receiver of the signal.

BRIEF DESCRIPTION OF THE FIGURES

In the following, the invention will be explained in more detail with reference to the examples of the appended drawings, wherein.

DESCRIPTION OF THE PREFERRED EMBODIMENTS

Figure 1:
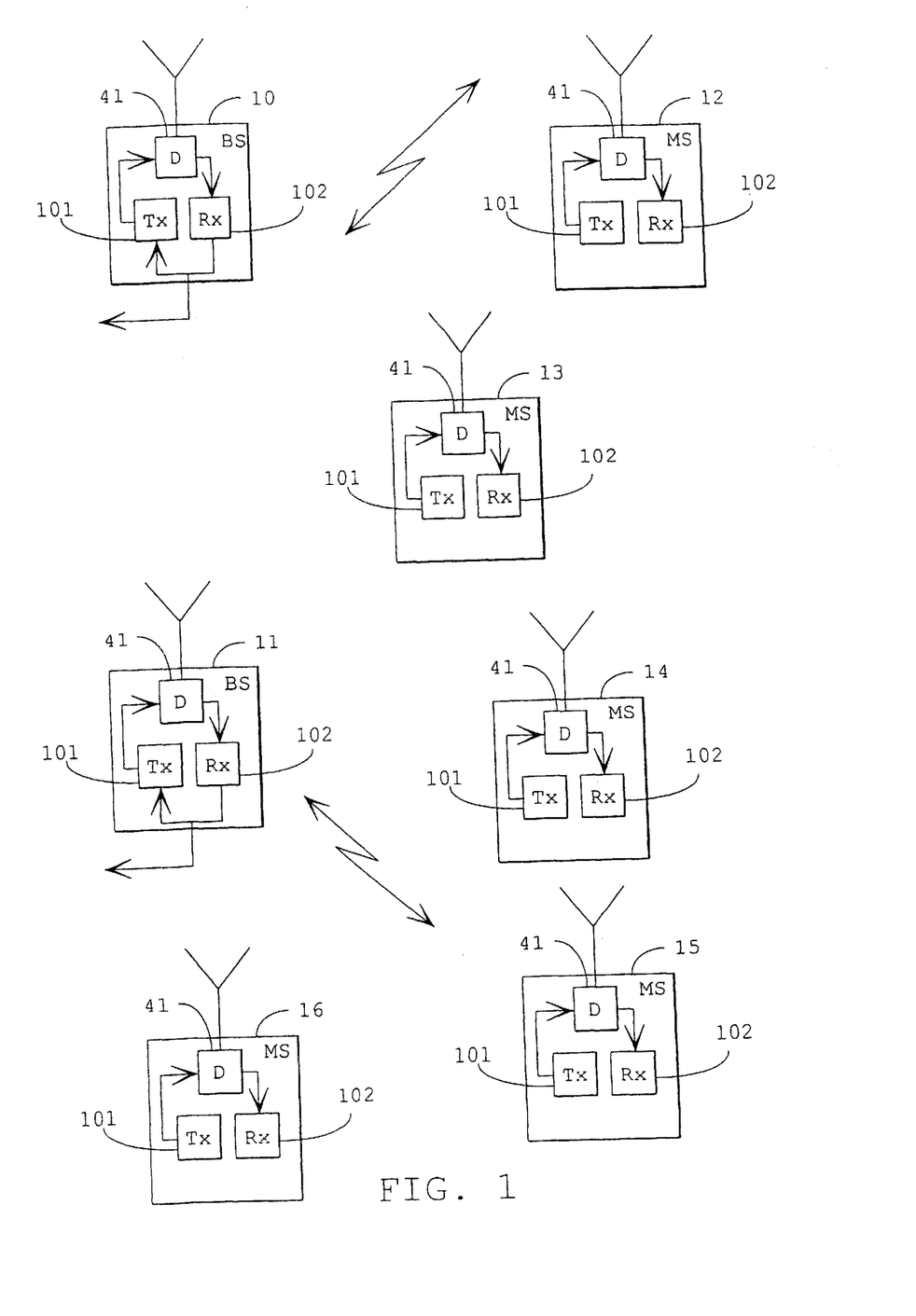
FIG. 1 illustrates a radio system.

FIG. 1 illustrates an example of a typical radio system comprising subscriber terminal equipments 12 to 16 and base stations 10 and 11. The base stations 10 and 11 and the subscriber terminal equipments 12 to 16 send and receive each other's signals 17. Both the base stations 10 and 11 and the subscriber terminal equipments 12 to 17 comprise a transmitter part 101 and a receiver part 102 and a means 41 separating them by which the operation of this transceiver construction is enabled. The base stations 10 and 11 are in a typical radio system connected to base station controllers (not shown in the figures) which can, in turn, be connected to a mobile services switching centre (not shown in the figures). A mobile services switching centre is connected to other telephone and telecommunication networks (not shown in the figures).

The solution of the invention can be used in a digital radio system where digital signals are sent by spreading a narrowband signal by a spreading code into a broadband signal. Typically a spreading code is a digital pseudo-noise code, such as in the CDMA system.

It is assumed that the subscriber terminal equipment 12 comes closer to the base station 10 and the subscriber terminal equipment 13 moves away from the base station 10, but that both subscriber terminal equipments 12 and 13 are connected to the base station 10. As the distance of the subscriber terminal equipments 12 and 13 from the base station 10 changes all the time, the propagation time of signals 17 and 18 to the base station 10 also varies. While the propagation time of the signal 17 shortens and the propagation time of the signal 18 grows, the chips of the spreading codes of signals 17 and 18 corresponding to one another move, that is, they are delayed with respect to one another. This causes the mutual interference of the signals 17 and 18 on the base station 10 to change as a function of a mutual shift. In the preferred embodiment of the invention, the base station 10 measures the mutual interference of the signals all the time and when the mutual interference grows too high, for example, the base station 10 sends preferably to the subscriber terminal equipment 12 a control command with which a new value is set for the phase of the spreading code of the subscriber terminal equipment 12, or the phase of the spreading code of the subscriber terminal equipment is changed continuously by hopping the phase preferably between at least two different phases.

Figure 2:
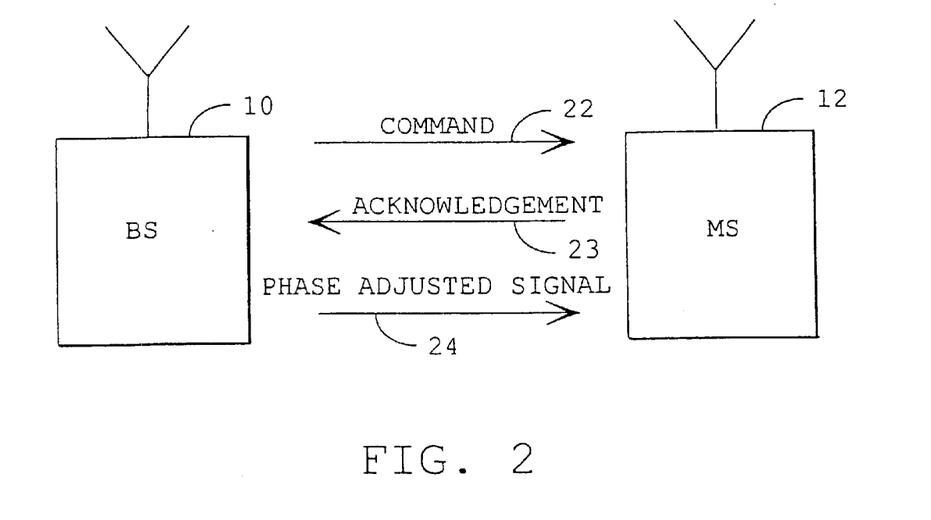
FIG. 2 illustrates traffic between a base station and a subscriber terminal equipment for setting a spreading code.

FIG. 2 shows a solution of the invention where the phase of the spreading code is set as high as desired. In a typical solution, the base station 10 measures the effect of the mutual interference of the subscriber terminal equipments 12 and controls the phase of the spreading code of the subscriber terminal equipments 12 by setting the phase as desired, or by hopping the phase. When the base station 10 wishes to adjust the phase of the spreading code of the subscriber terminal equipment 12, the base station 10 sends a control command signal 22 of the phase of the spreading code to the subscriber terminal equipment 12 preferably on a control channel in the same way as a power control command signal. Then the base station 10 starts to use the same phase of the spreading code or spreading code hopping as the subscriber terminal equipment 12 and 13 does. The subscriber terminal equipment 12 sends an acknowledgement signal 23 of phase adjustment of the spreading code after having received the control command signal 22. The control command 22 sent by the base station 10 controls at least the transmission of the traffic channel of the subscriber terminal equipment 12 until the base station 10 sends a new control command 22, and then the subscriber terminal equipment 12 sends its signal 24 spread-coded in the phase of the control command 22. The phase of the spreading code is preferably adjusted by adding to the spreading code or subtracting from the spreading code one or more chips or a part of a chip. By adding or subtracting only one chip of the spreading code, the adjustment information signal 22 can be made as short as possible and thus it will restrict the capacity of the radio system as little as possible. When using a digitized pulse form, adding a fraction of the chip of the spreading code can make the transmission band to broaden momentarily, which can be avoided by interpolating a part of the pulse by such a wave form that will not make the band to broaden. It is possible to operate in the same way by omitting a chip or parts of a chip and the omitted part can be replaced by a suitable wave form that will retain the band unchanged. These procedures can be made so that the prepared digitized chips or parts of chips are stored in memory which chips can be added to the required positions of the spreading code.

It is advantageous in the operation of the invention that the delays of signals from the subscriber terminal equipments 12 and 13 and thus the phase differences with respect to one another remain approximately the same as a function of time and distance. This is possible by adjusting the phase of the spreading codes of the signals 24. Then it is preferably avoided that the base station 10 monitors the delays of the subscriber terminal equipments 12 and updates the cross correlation matrixes between different subscriber terminal equipments, the matrixes being used in reducing the mutual interference of signals. Cross correlation $C(\tau)$ can in principle be calculated with the following formula (1)

$$C(\tau) = \int_A^B f_i(t) \cdot f_j(t+\tau)dt, \tag{1}$$

where $f_i(t)$ is signal i, $f_j(t+\tau)$ is a signal $\tau$, delayed by $\tau$, A and B define the calculation limits of cross correlation. The cross correlation matrix comprises correlations between different signals on values of different signals in the interval [A, B] where A and B are system-specific known values.

In the solution of the invention, the phases of the spreading codes of different signals 24 and 25 are not to be kept completely unchanged with respect to one another, but the intention is that the phase differences between the signals would be at the highest at the rate of N/8 where N is the length of a spreading code in chips per data symbol. In practice, N can be 64, for example, in which case the maximum phase difference is 8 chips. This means that the spreading codes of different signals and thus also data symbols are delayed only some chips with respect to one another and that data symbols are rather well in phase, that is, synchronized with respect to one another. The following example intends to illustrate this matter: the base station 10 receives two data symbols i and k of a spread-code adjusted signal which symbols may be received from subscriber terminal equipments 12 and 13 and which are spread by a nine-chipped spreading code:

| | |
|---|---:|
| 1 1 1 −1 1 −1 1 −1 −1 | sign. i datasymb.j |
| 1 1 −1 1 −1 1 −1 −1 −1 | sign. k datasymb. j, | where 1 and −1 on the lines denote the chips of the spreading code; the sequence of the chips on the upper line is a spreading code of some signal i with which some data symbol j of signal i is spread; on the lower line there is the spreading code of the data symbol j of some signal k which code has been transferred, that is, delayed with respect to a chip on the upper line about 1 chip. Chips 1 and −1 represent bits and they are derived from bits 0 and 1 in a known manner by using mapping from binary space [0, 1] to binary space [−1, 1]. Thus data symbols j in different signals i and k, derived from the subscriber terminal equipments 12 and 13 corresponding to the signals, are fairly in the same phase.

As the solution of the invention does not require precise synchronization adjustment for signals, the solution of the invention is easier to be implemented and applied to practice than a prior art solution which intends to maintain precise orthogonality of spreading codes. One important idea in the invention is that the mutual interference caused by propagation differences between signals or delays which are typically measured by cross correlation can be compensated by changing the phase of the spreading code.

Figure 3:
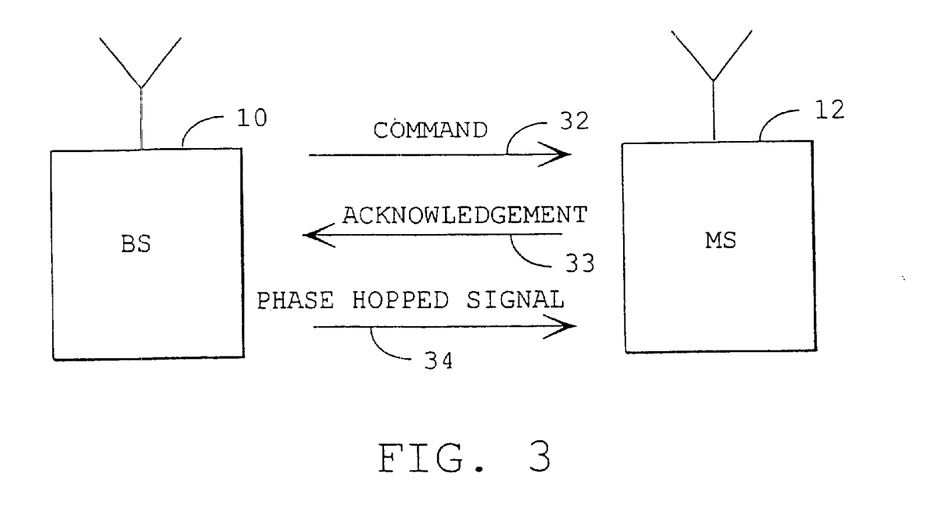
FIG. 3 illustrates traffic between a base station and a subscriber terminal equipment for hopping a spreading code.

FIG. 3 shows a typical situation of the invention where the base station 10 commands the subscriber terminal equipment 12 to hop its phase of the spreading code. This takes place so that the base station 10 sends an initiation or change command signal 32 of phase hopping of the spreading code to the subscriber terminal equipment 12 preferably on a control channel in the same way as a power control command signal. The subscriber terminal equipment 12 sends an acknowledgement signal 33 after having received the command signal 32 and sends after this a traffic channel signal 34 by using a hopping phase in a spreading code. The spreading code then has preferably at least two different phases which are used alternatively in a predetermined manner. The phase hopping of the spreading code makes the mutual dependence of the values of cross correlation of the signals from the subscriber terminal equipments at each moment is preferably randomized and a possible great, harmful value of cross correlation is only momentary. The values of cross correlation are not as such random but they can be calculated in advance, stored in memory and utilized in interference cancellation. For this reason, the solution of the invention enables manufacturing of simpler multi-user detectors with respect to the prior art.

Figure 4:
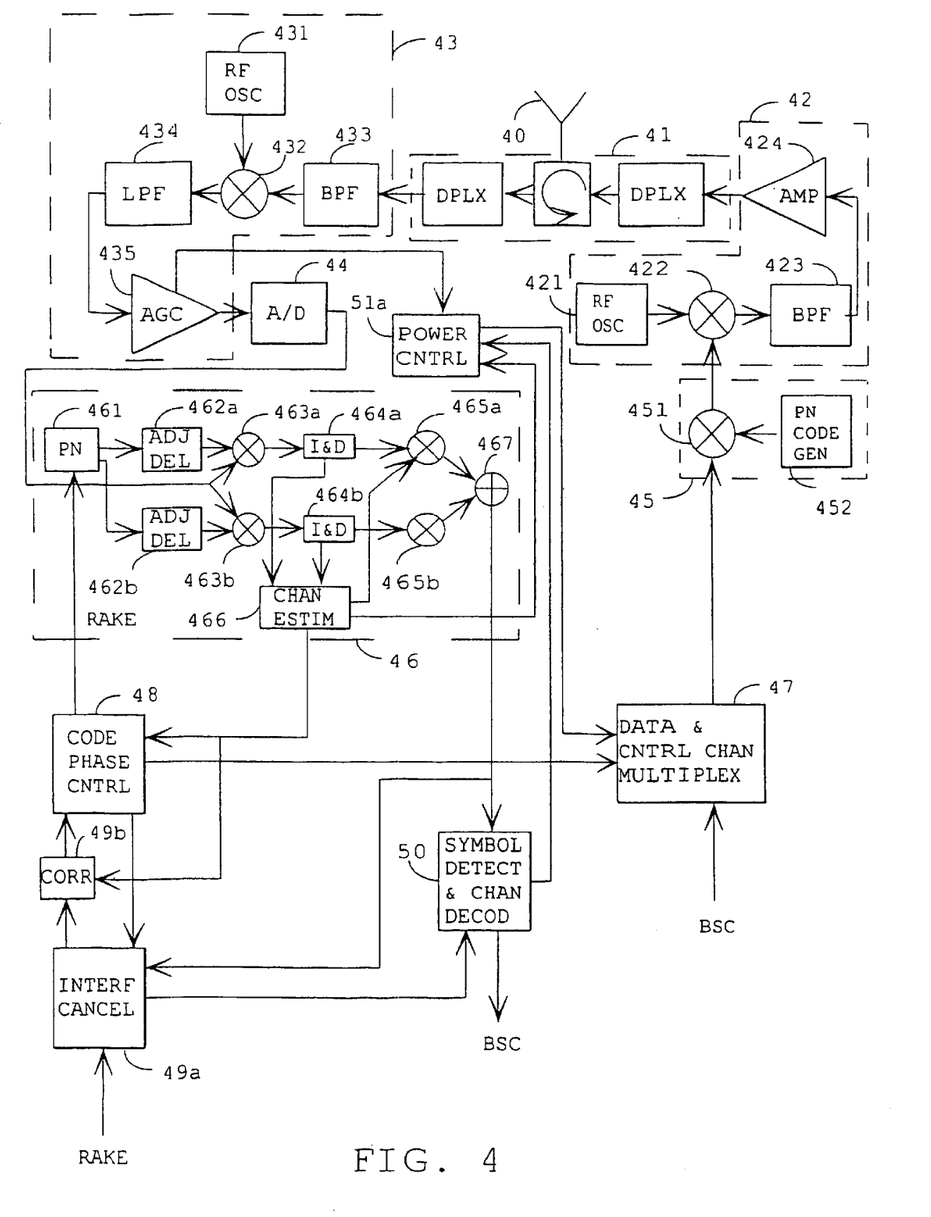
FIG. 4 illustrates a block diagram of a base station.

FIG. 4 shows a typical base station of the invention with essential parts. The base station comprises a transmitter 101 and a receiver 102. The base station comprises an antenna 40, means 41 for separating the transmission and reception direction. The means 41 for separating the transmission and reception direction typically comprise a duplex filter and possibly a circulator with which the separation of transmission and reception are improved. The transmission side 101 typically comprises radio frequency parts 43, an analog-to-digital converter 44, a reception part 46, a command means 48, an interference cancellation means 49a, an interference information means 49b, and a detection and decoding means 50. The radio frequency parts 43 include e.g. a radio-frequency oscillator 431 and a multiplier 432 where the received signal filtered by a band-pass filter 433 is multiplied by a signal of an oscillator 431 to reduce the frequency of the received signal.

Furthermore, the radio-frequency parts 43 can be thought to include a low pass filter 434 where a high-frequency part is deleted from the signal received from the multiplier 432, and an automatic gain control part 435 with which the signal level is maintained essentially unchanged. After this, the analog signal still propagates to the analog-to-digital converter 44 with which the signal is converted to a digital signal for the microprocessor-based further processing of the signal.

In CDMA receiver solutions, a RAKE receiver, for example, is generally used as a receiver part 46, a RAKE receiver comprising one or more RAKE branches. Each RAKE branch typically comprises delay adjustment parts 462a and 462b, multipliers 463a and 463b, I&D means 464a and 464b, multipliers 465a and 465b. The RAKE receiver part 46 further comprises a spreading code generator 461, a channel estimator 466 and a summer 467. Each branch is an independent receiver unit whose function it is to assemble and demodulate one received signal component. Each RAKE branch can be controlled for assembling and demodulation to synchronize with a signal component that has propagated via a different route by using delay adjustment parts 462a and 462b of different branches. Demodulation takes place in multipliers 463a and 463b. The signal propagates from the multiplier 463a to the I&D means 464a which operates in such a manner that it sums the bits of the binary signal from the multiplier 463a, the number of bits being equal to the number of the chips of the spreading code, corresponding to the spreading code sequence, that is, to the data symbol. After I&D summing, the result is reset and summing is started from the beginning for the next data symbol. The I&D means 464b operates in the similar way because the operation principle of RAKE branches is similar. After this in conventional CDMA receivers, the signals of the receiver branches are preferably combined by a summer 467, whereby a good-level sum signal can be preferably assembled. Summing can be weighted by an estimate of the channel estimator 466 in the multipliers 465a and 465b, whereby the effect of a poor branch on the sum can be reduced or eliminated completely in the same way as in prior art. The RAKE branches of the base station of the invention can also have specific antennas, radio frequency parts and A/D transformers. If different signal components are not combined in reception, the receiver part 46 is then essentially similar to one branch (461, 462a, 463a, 464a, 465a, 466 and 467) of the RAKE receiver part.

In the CDMA systems, multi-use interferences have also been reduced by means of several known multi-use interference cancellation methods (IC) and multi-user detection (MUD). With these methods, interference from the area of the user's own cell can be best reduced, and thus the capacity of the system can be improved. The size of the coverage area of the base station cannot be improved with these methods, that is, the size of the cell will not change when employing these methods. Signals are received by the interference cancellation means 49a from the receiver part 46, possible other receiver parts and the command means 48. The interference information means 49b calculates the mutual interference of the received signals, such as cross correlation, by means of formula (1). By using the signals it has received and mutual interference information in particular, the interference cancellation means 49a reduces interference present in the signal detection and decoding means 50. From the detection and decoding means 50 the signal propagates to the base station controller which further instructs the signal as required. The interference cancellation means 49a and the interference information means 49b operating by said IC and MUD methods are advantageous, but they are not essential for the invention.

The base station also typically comprises a power control means 51a which the base station uses for requesting the subscriber terminal equipment 12 and 13 to change its transmission power particularly when the control of the automatic gain control part 435 is essentially in its extreme position, the detection and decoding means 50 cannot distinguish the symbols well enough, or the channel estimator 466 finds that the channel operates unsatisfactorily.

The transmitter side 101 comprises radio-frequency parts 42, a spreading coder 45 and a channel multiplexer 47. The radio-frequency parts 42 comprise a radio-frequency oscillator 421, a multiplier 422 where the digital signal from the spreading coder 45 is multiplied by a high frequency carrier wave from the radio-frequency oscillator 421. The radio-frequency parts 42 also comprise a band-pass filter 423 with which the band of the radio-frequency signal is adapted to the requirements of the system, and an amplifier 424 with which a radio-frequency signal for the antenna is amplified.

The spreading coder 45 comprises a spreading code or pseudo-noise generator 451 and a multiplier 452 where the data signal is multiplied, that is, spread by a pseudo-noise spreading code. When the data to be sent, that is, the signal, is received by the base station 10 from the base station controller, the channel-coded signal propagates to the channel multiplexer 47 where power control information from the power control means 51a is combined to the signal. In the channel multiplexer 47, the control command of the spreading code from the command means 48 is combined to the signal in the same way as power information. After this, a narrowband data signal is spread by a spreading coder 45 into a broadband digital signal and the broadband signal is converted into a radio-frequency analog signal with radio-frequency means 42. The signal is sent by the antenna 40 via the means 41 having preferably a duplex filter, for example.

In the inventive solution, the command means 48, for example, detects that at least one of the signals sent to it by the channel estimator 466 or the interference information means 49b indicates the quality of the signal is unsatisfactory, in which case cross correlation, for example, is too high or the channel is of a poor quality. Then the command means sends to the channel multiplexer 47 a control command which propagates in the known manner preferably in the similar way as a power control command to the antenna 40 and further to the subscriber terminal equipments 12 and 13. According to the inventive solutions, the control command can be phase setting of the spreading code of the subscriber terminal equipment 12 and 13, or phase hopping of the spreading code at least between two different phases. The command means 48 converts the specific spreading code of the base station 10 by controlling the spreading code generator 461. The command means 48 preferably uses poor signal quality as a basis for sending a control command, but the command means 48 may send a control command also for some other reason and without any obvious reason relating to signal quality.

Figure 5:
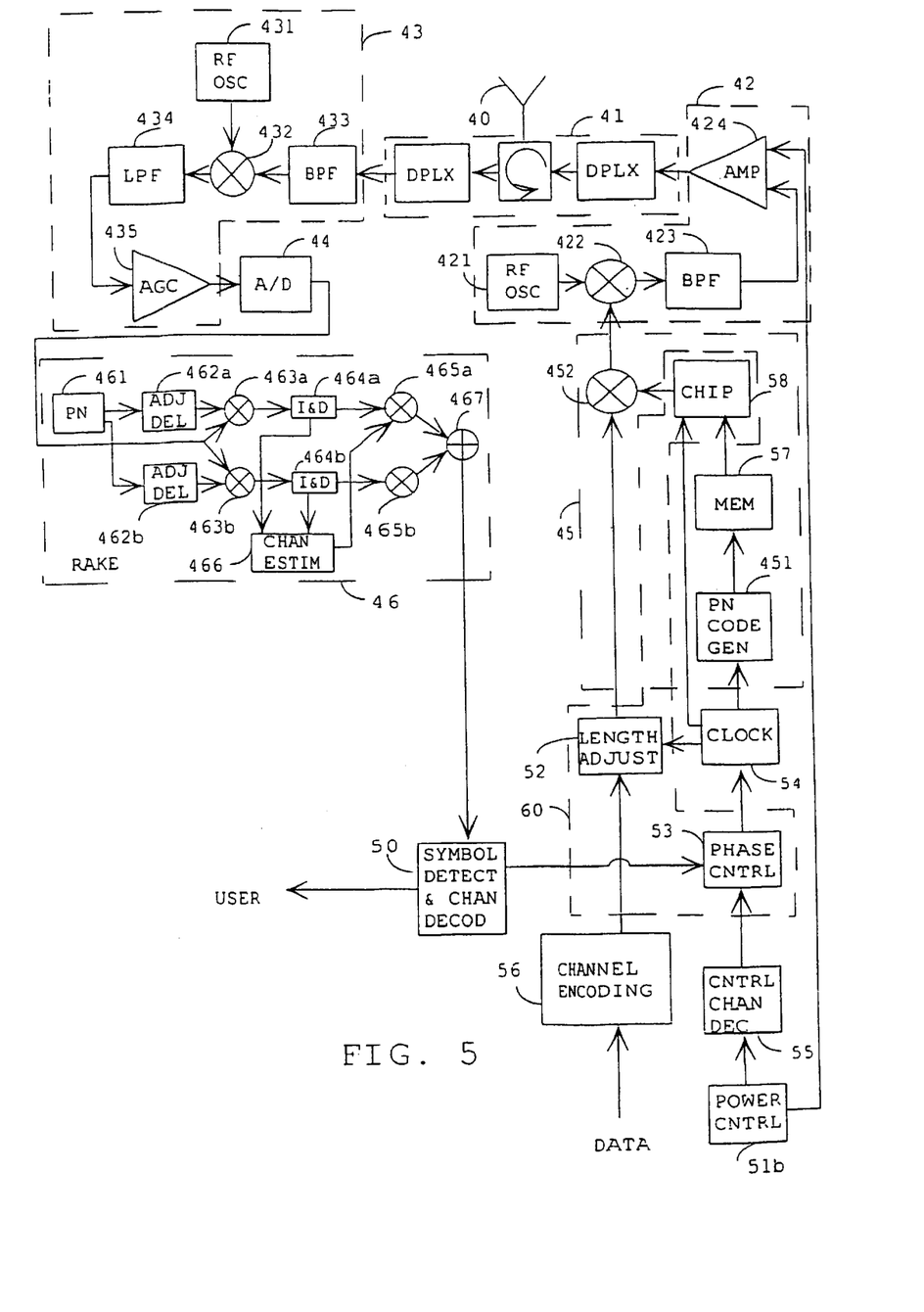
FIG. 5 illustrates a block diagram of a subscriber terminal equipment.

The structure of the subscriber terminal equipment 12 and 13 is fairly similar to that of the base station 10, comprising a transmitter 101 and a receiver 102. The subscriber terminal equipment comprises an antenna 40, means 41 for separating transmission and reception. The reception side 102 comprises radio-frequency parts 43, a receiver part 42, a detection and decoding means 50. These parts operate essentially in the same way as in the base station. The transmission side 101 comprises radio-frequency parts 42, a spreading coder 45, a power controller 51b, a symbol length adjuster 52, a spreading code control means 53, a clock 54, a control channel decoder 55 and a channel encoder 56. In the solution of the invention, the spreading coder comprises a spreading code generator 451, a buffer memory 57, a chip means 58 and a multiplier 452. The control means 60 of the invention comprises a symbol length adjuster 52, a spreading code control means 53 and a chip means 58. The need for a buffer memory 57 depends, however, on the implementation of the spreading code generator 451. If the spreading code generator 451 is a transfer register, the buffer memory 57 is needed, but if the spreading code generator 451 is implemented as a memory, the buffer memory 57 is of course not needed.

The reception of the subscriber terminal equipment operates essentially in the same way as that of the base station. A signal is received at an antenna 40 from which it propagates at least through a duplex type filter 41 to radio-frequency parts 43. The radio-frequency parts 43 lower the frequency of the signal to an intermediate frequency after which the analog-to-digital converter 44 converts the signal into a digital signal. The digital signal is processed by digital signal processing means which is in the reception part 46, for example. From the reception part 46, the signal propagates to the detection and decoding means 50 from which the signal further propagates to the user's applications. Speech data typically propagates to a loudspeaker from which the user will hear it. The reception also comprises a control channel decoding means 55 that in the solution of the invention decodes the control command of the spreading code sent by the base station and sends it further to the control means 53 of the spreading code. In the solution of the invention, the control means 53 controls the chip means 58 and the clock 54 of the spreading code which change in the spreading coder 45 the spreading code used by the subscriber terminal equipment for transmission. Typically, the control channel decoder 55 also decodes at least the power control command sent by the base station which it sends to the power controller 51b. The power controller 51b controls the transmission power of the subscriber terminal equipment 12 and 13 by controlling the amplifier 424, for example.

When a user's data is being sent, the signal is typically source-encoded, possibly encrypted and convolution-encoded. A signal is also channel-encoded in a channel encoder 56 from which in the solution of the invention the signal propagates to the symbol length adjuster 52 which is controlled by the spreading code control means 53. After this, the signal propagates in a known manner to the spreading coder 45, the radio-frequency parts 42 and via the means 41 to the antenna 40.

When in the solution of the invention the control command of the spreading code is decoded by a control channel decoder 55, the control means 53 of the spreading code can change the length of the data symbol to be sent and/or the frequency of the clock controlling the pseudo-noise generator 451, both of which ways can have an effect on how many chips of a spreading code can be used simultaneously to spread one data symbol.

Further or alternatively, the spreading code control means 53 may control the chip means to increase or decrease the chips of the spreading code. The control means 60 of the invention thus comprises a spreading code control means 53, a symbol length adjustment means 52 and a chip means 58.

The operation of the subscriber terminal equipment in the solution of the invention is now examined in more detail. After having received a command to change the spreading code, the spreading code control means 53 instructs the symbol length adjusting means 52 to extend the length of the data symbol, for example. In this case, the operation of the clock 54 is not changed. Because the length of the data symbol has been extended, the spreading code has be supplemented by a chip, chips or parts of a chip to the extent that the length of the spreading code is essentially the same as the length of the data symbol. This takes place in the chip means 58 which is controlled by the spreading code control means 53. The effect of the extension of the data symbol on the length of the spreading code can also be compensated so that the control means 53 slows down the operation of the clock 54. This is followed by that the chips of the spreading code lengthen and a chip, chips or parts of a chip need not necessarily be added to the spreading code by the chip means 58. Moreover, it is also possible to add a chip, chips or parts of a chip to the spreading code and at the same time slow down the operation of the clock 54, provided that the length of the spreading code is suitable with respect to the length, i.e. to the duration of the data symbol.

If the length of the data symbol is shortened, in the solution of the invention the spreading code control means 53 will instruct the chip means to delete a chip, chips or parts of a chip in such a manner that the length of the spreading code will be adapted to the length of the data symbol. Another possibility is that the spreading code control means 53 accelerates the operation of the clock 54 so much that the number of chips need not be changed but the unchanged spreading code is essentially of the length of the shortened data symbol. In the solution of the invention, it is possible that the chip means 58 will delete a chip, chips or parts of a chip while the frequency of the clock 54 is increased, provided that the length of the spreading code is suitable with respect to the length of the data symbol.

It is also possible in the solution of the invention that the length of the data symbol is not changed but the spreading code control means 53 changes the frequency of the clock 54 higher and at the same time instructs the chip means 58 to add a chip, chips or parts of a chip to the spreading code so that the spreading code propagating faster because of a higher clock frequency is essentially of the length of the data symbol. Another alternative is that the spreading code control means 53 changes the frequency of the clock 54 lower and at the same time, instructs the chip means 58 to decrease a chip, chips or parts of a chip from the spreading code in such a manner that the spreading code propagating slower because of the lower clock frequency is essentially of the length of the data symbol. The spreading code control command comprises information, for example, on the transmitter which should change its spreading code, and possibly information about the duration of the change. The transmitter changing its spreading code is typically a subscriber terminal equipment. In these implementations, the change of the clock frequency of the clock 54 depends on the implementation of the spreading code generator 451. If the spreading code generator 451 is a transfer register, it is necessary to change clock frequency in order that the spreading code of the spreading code generator 451 would change its temporal length. If the spreading code generator 451 is implemented as a memory, it is not necessary to change the frequency of the clock to change the length of the spreading code, but it is possible to hop from the memory of the spreading code generator 451 over the memory address, or read the same memory address several times.

In the second solution of the invention, the spreading code is hopped at least between two different spreading codes. This is accomplished for example in such a manner that the spreading code control means 53 instructs the chip means 58 to change the phase of the spreading code in suitable turns, in which case the starting point of the spreading code will preferably change. At the same time, the spreading code control means 53 changes, when needed, the frequency of the clock so that the spreading code is essentially of the length of the data symbol. In the solution of the invention, a chip, chips and/or parts of a chip can be added to or subtracted from the spreading code, in which case the phase will change. The chip means 58 can change the phase of the spreading code by selecting alternatively one of at least two spreading code sequences with a different phase which are preferably stored in the buffer memory 57. Phasing can be implemented by using a transfer register type memory having different delays for different spreading codes, that is, the chips of the spreading code are transferred with respect to one another in different transfer registers. The spreading codes can be alternatively stored in a matrix type memory in lines, for example, from which the spreading code is read alternatively from different lines during hopping. The phase of the spreading code is preferably different on different lines. This makes it possible to hop directly from a specific spreading code to any phase of the code as the spreading code is pseudo random. The spreading code control means 53 have a hopping instruction according to the control command in store, by means of which instruction the control means 53 controls both the clock 54 and the chip means. The hopping instruction comprises e.g. information about the transmitter that is to hop its spreading code, about at least two different spreading codes which are to be used in hopping, and possibly about the duration of hopping. As the hopping sequence is known both to the transmitter 101 and to the receiver 102, that is, it is predetermined, both hop its spreading code synchronously and thus it is possible to decode the spreading code in reception. Four or eight hopping phases are typically a sufficient amount. A transmitter which hops its spreading code is typically a subscriber terminal equipment.

As the transceivers of the base station 10 and the subscriber terminal equipment 12 and 13 are in main parts similar, it is also possible to implement the solution of the invention so that the subscriber terminal equipment 12 and 13 sends a spreading code control command to the base station 10 and the base station 10 controls its spreading code according to the inventive solution. Digital signal processing is preferably carried out both in the base station and the subscriber terminal equipment on the basis of a microprocessor by VLSI and ASIC circuits, for example.

Although the invention was above explained with reference to the example of the accompanying drawings, it will be evident that the invention is not restricted thereto, but it can be modified in various ways within the scope of the inventive idea disclosed in the appended claims.

What is claimed is:

1. A method for reducing interference used in a radio system, the radio system including a plurality of base stations and subscriber terminal equipment, at least one of the plurality of base stations and subscriber terminal equipment being configured to spread a narrowband signal into a broadband signal using a spreading code, the method comprising:

receiving one or more different signals having a corresponding spreading code associated therewith using a receiver;

forming mutual interference information on the one or more different signals;

sending a control command using the receiver based on the mutual interference information, the control command including information about a size of a phase control configured to set a phase setting of the spreading code corresponding to the one or more different signals;

changing the phase setting of the spreading code corresponding to the one or more different signals;

adjusting the phase of the spreading code corresponding to the one or more different signals using the transmitter based on the control command to diminish mutual interference between the one or more different signals.

2. A method for reducing interference used in a radio system, the radio system including a plurality of base stations and subscriber terminal equipment, at least one of the plurality of base stations and subscriber terminal equipment being configured to spread a narrowband signal into a broadband signal using a spreading code, the method comprising:

receiving one or more different signals having a corresponding spreading code associated therewith using a receiver;

sending a control command using the receiver, the control command including information about phase hopping, between different phases associated with the spreading code corresponding to the one or more different signals;

hopping the phase of the spreading code corresponding to the one or more different signals continuously based on a predetermined sequence between different phases associated with the spreading code; and adjusting the phase of the spreading code using a transmitter based on the hopping to diminish mutual interference between the one or more different signals.

3. The method of claim 2, wherein the phase of the spreading code is adjusted with an accuracy of one chip.

4. The method of claim 2, wherein the phase of the spreading code is adjusted with an accuracy of a fraction of a chip of the spreading code.

5. The method of claim 2, wherein the control command includes a starting of spreading code hopping when the mutual interference information is greater than a predetermined value.

6. The method of claim 5, wherein the forming of the mutual interference information includes calculating a cross correlation of the one or more different signals.

7. The method of claim 2, wherein at least one subscriber terminal equipment operates as the transmitter of the signal and at least one base station operates as the receiver of the signal.

8. A method according to claim 1, wherein the phase of the spreading code is adjusted with an accuracy of one chip.

9. A method according to claim 1, wherein the phase of the spreading code is adjusted with an accuracy of a fraction of a chip of the spreading code.

10. A method according to claim 1, wherein the forming of the mutual interference information comprises calculating a cross correlation of the one or more different signals.

11. A method according to claim 1, wherein at least one subscriber terminal equipment operates as the transmitter of the signal and at least one base station operates as the receiver of the signal.

12. A radio system including a plurality of base stations and subscriber terminal equipment, the radio system comprises:

a receiver configured to receive one or more different signals having a corresponding spreading code associated therewith and comprising an interference information means for forming mutual interference information on the one or more different signals, the receiver further comprising a command means arranged to form a control command of a phase of the spreading code based on the mutual interference information and to send information about a size of phase adjustment of the spreading code in the control command, and the receiver being arranged to adjust the phase of the spreading code on the basis of the control command; and a transmitter configured to spread a narrowband signal into a broadband signal using a spreading code and including a control means for adjusting the phase of the spreading code based on the control command.

13. The radio system of claim 12, wherein the command means is arranged to form and send a spreading code control command which includes information about a single phase change of the spreading code, and the control means is arranged to adjust the phase of the spreading code according to the control command.

14. The radio system of claim 12, wherein the command means and the control means are arranged to change the phase of the spreading code with an accuracy of one chip.

15. The radio system of claim 12, wherein the command means and the control means are arranged to change the phase of the spreading code with an accuracy of a fraction of one chip.

16. The radio system of claim 12, wherein the interference information means is arranged to calculate a cross correlation of the one or more different signals.

17. The radio system claim 12, wherein the receiver is at least one base station and the transmitter is at least one subscriber terminal equipment.

18. A radio system including a plurality of base stations and subscriber terminal equipment, the radio system comprises:

a receiver configured to receive one or more different signals having a corresponding spreading code associated therewith, the receiver comprising an interference information means for forming mutual interference information on the one or more different signals and a command means arranged to form a control command of a phase of the spreading code on the basis of the mutual interference information and to send information about a sequence of spreading code hopping, wherein the receiver is arranged to adjust the phase of the spreading code on the basis of the control command, and a transmitter configured to spread a narrowband signal into a broadband signal using a spreading code and comprising a control means for adjusting the phase of the spreading code on the basis of the control command.

19. A radio system according to claim 18, wherein the command means is arranged to form and send a spreading code control command which comprises information about the phase hopping, and wherein the control means is arranged to hop the phase of the spreading code according to a predetermined sequence.

* * * * *